(12) United States Patent
Matsui (10) Patent No.: US 12,216,948 B2
(45) Date of Patent: Feb. 4, 2025

(54) IMAGE FORMING APPARATUS THAT PRINTS AT DIFFERENT SPEEDS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Kenta Matsui, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/970,840

(22) Filed: Oct. 21, 2022

(65) Prior Publication Data

US 2023/0126389 A1 Apr. 27, 2023

(30) Foreign Application Priority Data

Oct. 27, 2021 (JP) .................................. 2021-175846

(51) Int. Cl.
*G06F 3/12* (2006.01)

(52) U.S. Cl.
CPC .......... *G06F 3/1208* (2013.01); *G06F 3/1215* (2013.01); *G06F 3/1253* (2013.01)

(58) Field of Classification Search
CPC .... G06F 3/1208; G06F 3/1215; G06F 3/1253; Y02D 10/00; G03G 2215/2045
See application file for complete search history.

(56) References Cited

U.S. PATENT DOCUMENTS

| | | | |
|---|---|---|---|
| 2004/0264992 A1* | 12/2004 | Shiraishi | G03G 15/2046 399/69 |
| 2007/0014613 A1* | 1/2007 | Ohashi | G06F 3/1234 400/62 |
| 2012/0163892 A1* | 6/2012 | Katahira | B41J 11/42 400/76 |
| 2013/0100478 A1* | 4/2013 | Ogasawara | G06K 15/1856 358/1.14 |
| 2017/0344818 A1* | 11/2017 | Yoshizumi | G06F 3/1208 |
| 2018/0022107 A1* | 1/2018 | Fujiwara | B41J 2/2146 347/14 |
| 2020/0130971 A1* | 4/2020 | Kawabata | G03G 15/5029 |
| 2021/0195033 A1* | 6/2021 | Kawano | G06F 3/1208 |
| 2021/0271440 A1* | 9/2021 | Segawa | G06F 3/1275 |
| 2021/0357713 A1* | 11/2021 | Shimomura | G06K 15/1881 |

FOREIGN PATENT DOCUMENTS

JP 2013196234 A 9/2013

OTHER PUBLICATIONS

English Machine Translation of KR 20220050336-A (Uichoon, Filed Oct. 16, 2020) (Year: 2020).*
English Machine Translation of JP 2013-027984-A (Hatanaka, Published Feb. 2, 2013) (Year: 2013).*

* cited by examiner

*Primary Examiner* — Juan M Guillermety
(74) *Attorney, Agent, or Firm* — ROSSI, KIMMS & McDOWELL LLP (57) ABSTRACT

If a sheet type of a sheet used for printing a print job is a predetermined sheet type (e.g., thick sheet) for which printing at a normal speed is impossible, a job control unit of an image forming apparatus sets the printing speed to a low speed and prints the print job with a printing resolution as high resolution.

13 Claims, 8 Drawing Sheets

IMAGE FORMING APPARATUS THAT PRINTS AT DIFFERENT SPEEDS, METHOD FOR CONTROLLING IMAGE FORMING APPARATUS, AND STORAGE MEDIUM

BACKGROUND OF THE INVENTION

Field of the Invention

The present invention relates to an image forming apparatus, a method for controlling the image forming apparatus, and a storage medium.

Description of the Related Art

Conventionally, there are printing apparatuses that can select one printing resolution among several printing resolutions to print a document. Japanese Patent Application Laid-Open No. 2013-196234 proposes a technology for printing a document at an appropriate character size by switching the printing resolution used for printing the document according to the output character size when printing characters included in the document.

Some printing apparatuses are equipped with a printer engine that supports two types of printing speeds: normal speed and lower speed. This type of printing apparatus basically prints at the normal speed. In case of using some types of sheets for printing, it is necessary to print at a low speed in order to prevent a poor fixing of toner. For example, some types of sheets, such as thick sheet and surface-treated sheet, require printing at a low speed to prevent a poor fixing of toner, etc., because printing materials such as toner are not easily fixed on the sheet surface.

To cut costs, the amount of memory installed in a control unit that controls the printer engine is sometimes reduced. In such a control unit, the printing resolution is set to be low so that printing can be performed at the normal speed of the printer engine even with a small amount of memory.

As described above, in case where some types of sheets are used, the control unit reduces the printing speed to a low speed for printing even if the print setting is made to perform printing with low resolution. In this case, the printing operation is performed at low resolution, and the primary performance of the apparatus is not fully utilized. It is possible to print at high resolution if printed at low speed, and users expect high resolution printing if printed at low speed. Thus, there are cases in which the output result of the image quality expected by the user could not be obtained. In this case, the user might set the printing resolution to be higher and perform printing again. In order to reduce the occurrence of such a situation, a technology to perform the printing process by appropriately switching the printing resolution and printing speed is required.

SUMMARY OF THE INVENTION

According to an aspect of the present invention, an image forming apparatus that prints a print job at a printing speed of a first printing speed and a second printing speed slower than the first printing speed, and is capable of printing at a printing resolution of a first resolution if the printing speed is the first printing and at the printing resolution of a second resolution higher than the first resolution if the printing speed is the second printing speed, the image forming apparatus comprises a receiving unit configured to receive the print job; and a control unit configured to switch the printing speed and the printing resolution when printing the print job, wherein in a case where a sheet type of a sheet used for printing the print job is a predetermined sheet type that cannot be printed at the first printing speed, the control unit sets the printing speed to the second printing speed, and the printing resolution to the second resolution to print the print job.

Further features of the present invention will become apparent from the following description of exemplary embodiments with reference to the attached drawings.

DESCRIPTION OF THE EMBODIMENTS

Embodiments for carrying out the present invention will be described below using drawings.

First Embodiment

Figure 1:
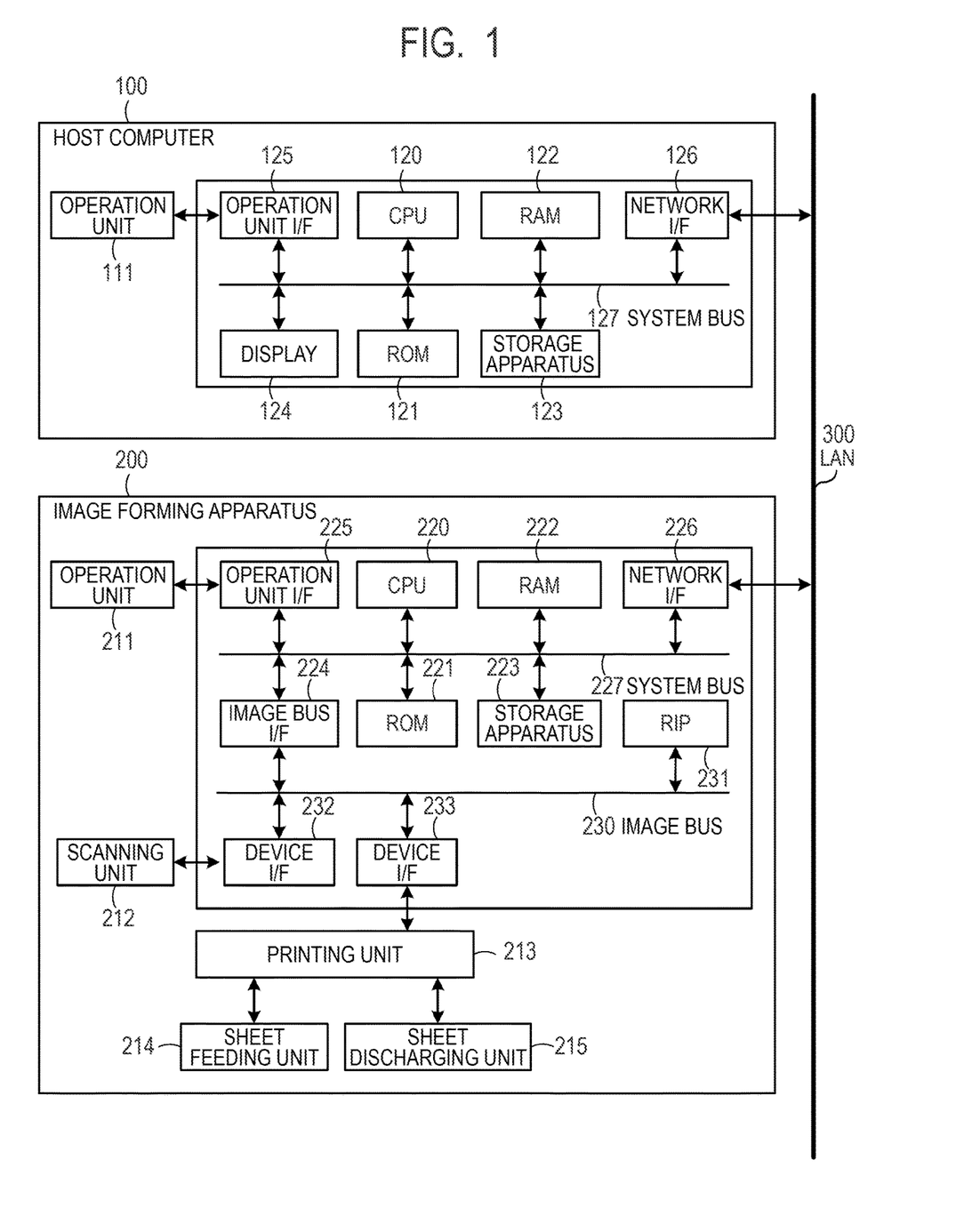
FIG. 1 illustrates a configuration diagram showing a printing system including an image forming apparatus showing the present embodiment.

FIG. 1 illustrates a diagram showing an example of the configuration of a printing system including an image forming apparatus showing one embodiment of the present invention.

In this system, a host computer 100 and an image forming apparatus 200 are connected via a LAN 300. A user transmits a job described in a page description language from the host computer 100 to the image forming apparatus 200 via the LAN 300 by using a printer driver running on the host computer 100. Here, an MFP (Multi Function Printer) is shown as the image forming apparatus 200 of the present embodiment, but the image forming apparatus 200 may be an SFP (Single Function Printer).

[Hardware Configuration of the Host Computer]

An example of a hardware configuration in the host computer 100 of the present embodiment will be described with reference to FIG. 1. A CPU 120 is a central processing unit for controlling each part and the whole of the host computer. The CPU 120 executes programs stored in a storage apparatus 123. Programs executed by the CPU 120 include, for example, application programs, utility programs, printer driver programs, OS (Operating System), and network printer control programs. The CPU 120 also performs control of temporarily storing information, files, and the like necessary for the execution of the program in a RAM 122 when running the program.

A ROM 121 is a storage medium that stores programs such as basic I/O programs and various data such as font data and template data used in document processing. The RAM 122 is a storage medium that temporarily stores data and functions as the main memory or work area of the CPU 120. The storage apparatus 123 is one of the external storage apparatuses and functions as mass storage. The storage apparatus 123 stores an application program, a utility program, a printer driver program, an OS, a network printer control program, and related programs.

An operation unit I/F 125 is a user interface for the user to input instructions. An operation unit 111 includes a keyboard, a mouse, and the like, and the user uses the keyboard, the mouse, and the like to give input instructions to the host computer 100. A display 124 displays various programs executed on the host computer 100. A system bus 127 is a data transmission path within the host computer 100. A network I/F 126 is an interface for exchanging information with the image forming apparatus 200 via the LAN 300.

[Hardware Configuration of the Image Forming Apparatus]

An example of a hardware configuration in the image forming apparatus 200 of the first embodiment will be described with reference to FIG. 1. The image forming apparatus 200 has a printing unit 213 which is an image output device. The image forming apparatus 200 receives a print job (hereinafter referred to as a "job") from the host computer 100 via the LAN 300.

A CPU 220 is a central processing unit for controlling each part and the whole of the image forming apparatus 200. A RAM 222 is system work memory for operating the CPU 220. The RAM 222 is also a memory for temporarily storing received jobs, intermediate data generated for image forming processing, a work area when rendering processing, and input image data. A ROM 221 is, for example, a boot ROM, in which the boot program of the system is stored. A storage apparatus 223 is, for example, a hard disk drive and stores system software for various processing and received jobs.

An operation unit I/F 225 is an interface unit to an operation unit 211 having a display unit for displaying various menus, job information, and the like, and outputs data of an operation screen to the operation unit 211. The operation unit I/F 225 transmits the information input by the user to the CPU 220 via the operation unit 211. A network I/F 226 is an interface for exchanging information with an external device (the host computer 100) via the LAN 300. The CPU 220, the ROM 221, the RAM 222, the storage apparatus 223, the operation unit I/F 225, and the network I/F 226 are connected to a system bus 227.

An image bus I/F 224 is an interface for connecting the system bus 227 and an image bus 230, which transfers image data at high speed, and is a bus bridge for converting data structures. The image bus 230 is connected to RIP (Raster Image Processor) 231 and device I/Fs 232 and 233.

Based on instructions from the CPU 220, the CPU 220 generates intermediate data (display list) from the print job. Further, the CPU 220 generates a raster format images by interpreting the generated intermediate data. The rendered image is transmitted to the printing unit 213 via the system bus 227 and the device I/F 233, or to the RAM 222 or the storage apparatus 223 via the image bus I/F 224. The RIP 231 may be implemented either in hardware or in software running inside a general purpose CPU.

The device I/F 232 is an interface for receiving data from a scanning unit 212. The scanning unit 212 is connected to the device I/F 232 and generates raster format images from a scanned sheet. The generated image is transmitted to the printing unit 213 via the system bus 227 and the device I/F 233, or to the RAM 222 or storage apparatus 223 via the image bus I/F 224.

The device I/F 233 is an interface for transmitting data to the printing unit 213. The printing unit 213 is connected to the device I/F 233, prints the image generated by the instruction of the CPU 220 on a sheet fed from a sheet feeding unit 214, and discharges the sheet to a sheet discharging unit 215. The printing unit 213 supports printing at the normal speed and printing at a lower speed, which is slower than the normal speed. The printing at the normal speed allows printing at low printing resolution and the printing at the low speed allows printing at high printing resolution.

The amount of heat required to fix the print toner to the sheet varies depending on sheet types. Therefore, the printing unit 213 changes the conveyance speed according to the type of sheet fed from the sheet feeding unit 214 and applies heat according to the type of sheet to fix the print toner to the sheet. The transfer speed of the printing unit 213 is changed by the instruction of the CPU 220. Since the transfer speed of the printing unit 213 changes, the CPU 220 instructs the RIP 231 to render the image according to the transfer speed.

[Software Configuration of the Printer Driver on the Host Computer]

Figure 2:
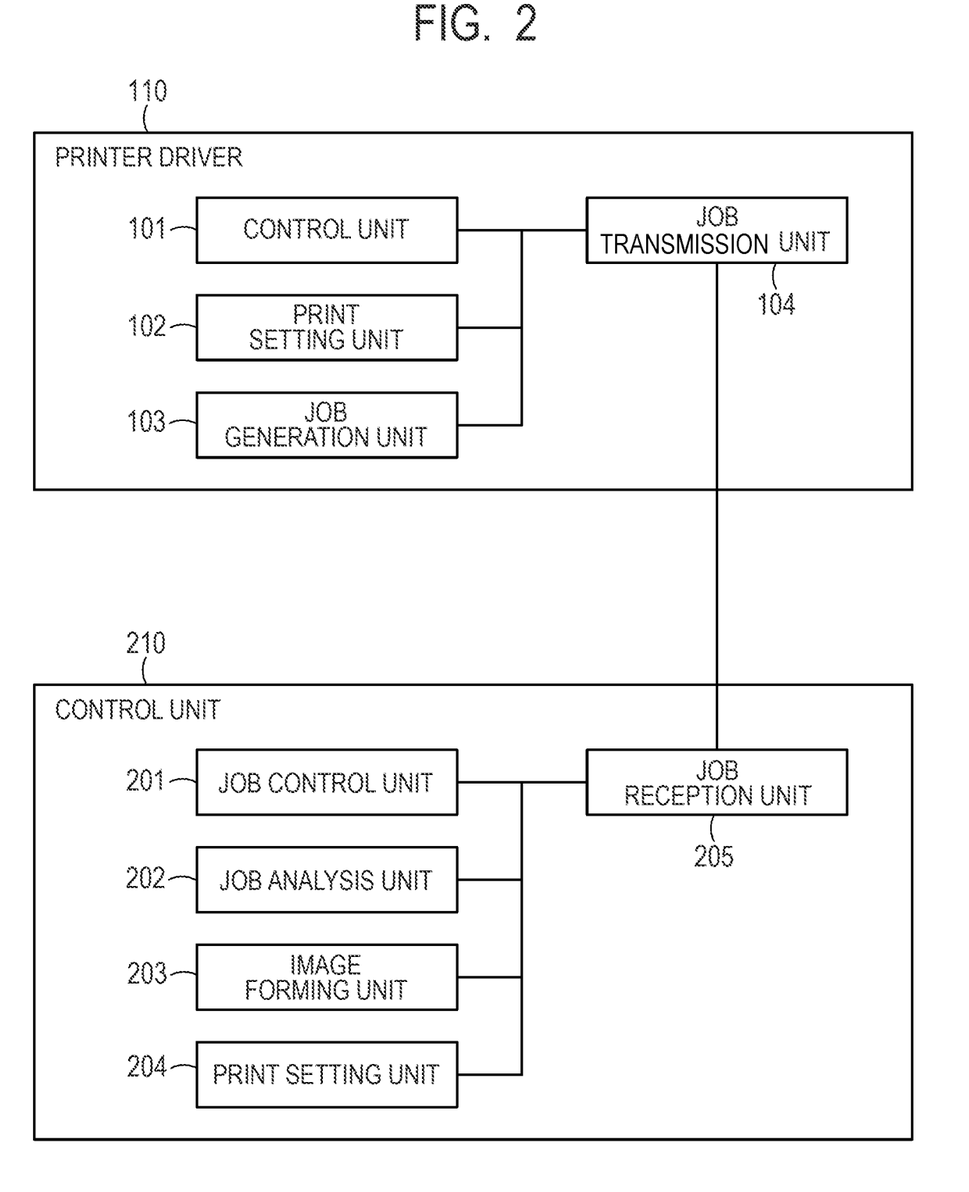
FIG. 2 illustrates a diagram of a software configuration in the printing system of the present embodiment.

FIG. 2 illustrates a diagram showing an example of the software configuration in the printing system of the present embodiment. The software configuration of a printer driver 110 executed on the host computer 100 of the present embodiment will be described below with reference to FIG. 2. A control unit 101 of the printer driver 110 controls each software unit operating on the CPU 120 from the reading of print data specified by the user to the transmission of the print data as a job to the image forming apparatus 200.

A print setting unit 102 notifies a job generation unit 103 of print setting information such as print sheets and printing resolution specified by the user. The job generation unit 103 reads the print data specified by the user, and together with the print setting information notified from the print setting unit 102, generates a job to be transmitted to the image forming apparatus 200. The job transmission unit 140 transmits the job generated by the job generation unit 103 to the image forming apparatus 200.

[Job Configuration]

Figure 6:
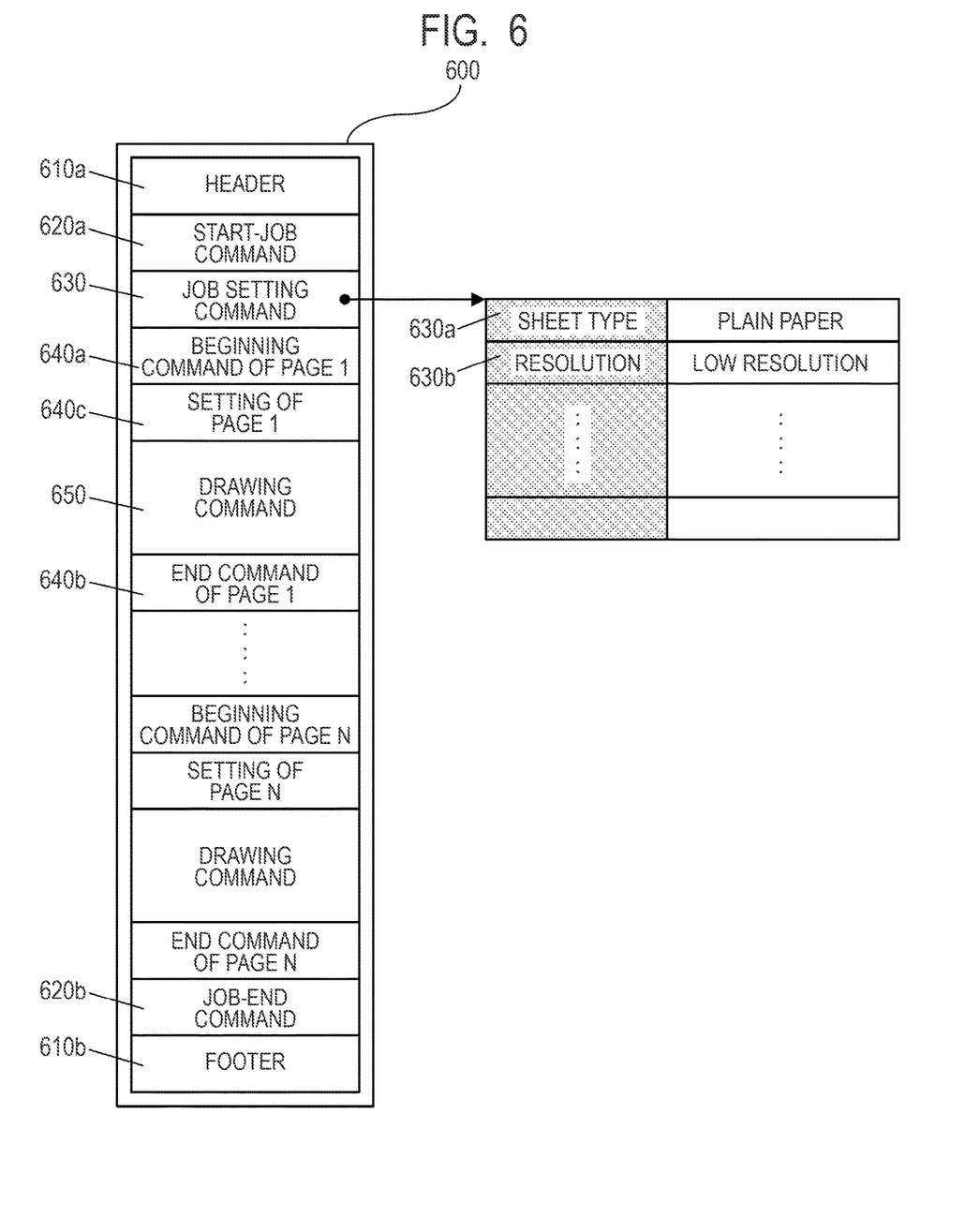
FIG. 6 illustrates a configuration of a print job.

FIG. 6 illustrates an example showing the configuration of a job 600 generated by the job generation unit 103. The job 600 has a specific header 610a and a specific footer 610b at the head and the end of a data structure of the job 600, respectively, so that the image forming apparatus 200 can recognize and process data of the job 600 as a job. The job 600 includes start-job command 620a and job-end command 620b that indicate the start and end of a job, and a job setting command 630 that specifies job information and valid print settings for each job. In the job setting command 630, a sheet type 630a (plain sheet in the present embodiment), which indicates the sheet type used for printing, and printing resolution 630b (low resolution), which indicates the resolution for printing, are specified. Many other print settings can be specified in the job setting command 630, but these are omitted here.

The job 600 further includes commands 640a and 640b for starting and ending pages, a page setting command 640c for specifying valid print settings for each page, and a plurality of drawing command groups 650 for drawing characters, images, and figures for n pages.

[Software Configuration of the Control Unit on the Image Forming Apparatus]

A software configuration of a control unit 210 executed by the image forming apparatus 200 of the present embodiment will be described below with reference to FIG. 2. A job control unit 201 is software that operates on the CPU 220 and controls jobs related to printing to print the jobs. The job control unit 201 controls hardware and software related to copying operation using the scanning unit 212. Therefore, each software unit involved in printing a job shown in FIG. 2 is controlled by the job control unit 201 operated by the CPU 220.

A job reception unit 205 receives, via a network I/F 226, a job transmitted from the host computer 100 via the LAN 300. A job analysis unit 202 analyzes the job received by the job reception unit 205. The job analysis unit 202 notifies the job control unit 201 of the print setting information obtained from the analysis result of the job. In addition, the job analysis unit 202 obtains drawing information for printing each page based on the job and performs intermediate data generation processing to be used for image forming processing.

An image forming unit 203 generates raster format image data from the intermediate data generated by the job analysis unit 202. The job control unit 201 transfers the raster format image data generated by the image forming unit 203 to the printing unit 213 for printing.

A print setting unit 204 notifies the job control unit 201 of print setting information such as the type of printing sheet, printing resolution, and the like, set by the user via the operation unit 211 (or via the remote UI and the like). However, the job control unit 201 in the present embodiment sets the print setting information (job setting command 630) included in the job generated by the printer driver 110 with priority over the print setting information notified by the print setting unit 204. That is, if the print setting information is not included in the received job, the job control unit 201 in the present embodiment sets the print setting information notified by the print setting unit 204 and prints the job.

Figure 3:
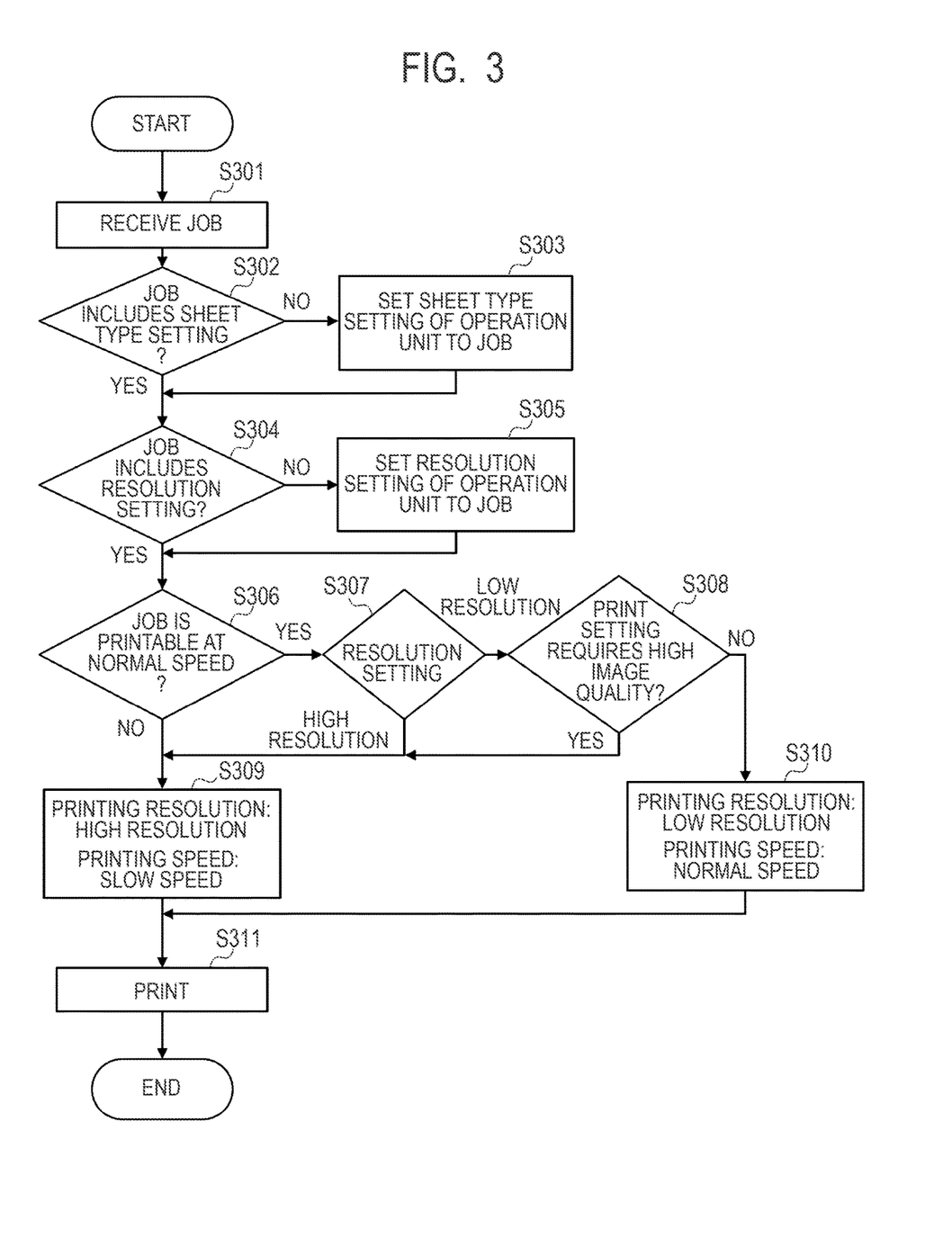
FIG. 3 illustrates a flowchart showing a processing of a control unit of the image forming apparatus of the first embodiment.

FIG. 3 illustrates a flowchart showing an example of processing until the control unit 210 of the image forming apparatus 200 of the first embodiment prints the received job. That is, the processing shown in this flowchart is realized by the CPU 220 reading a program stored in the ROM 221 or the storage apparatus 223 into the RAM 222 and executing the program as needed.

In step S301, when the job reception unit 205 of the control unit 210 receives a job to be printed, the process proceeds to step S302. In step S302, the job analysis unit 202 analyzes the received job and determines whether the sheet type (630a) used by the job control unit 201 for printing is set in the received job. If the sheet type for printing is set in the job (Yes in step S302), the process proceeds to step S304.

On the other hand, if the sheet type for printing is not set in the job (No in step S302), the process proceeds to step S303. In step S303, the print setting unit 204 notifies the job control unit 201 of the sheet type set by the user via the operation unit 211. The job control unit 201 sets the sheet type notified from the print setting unit 204 as the sheet type for printing the job, and the process proceeds to step S304.

Figure 8A:
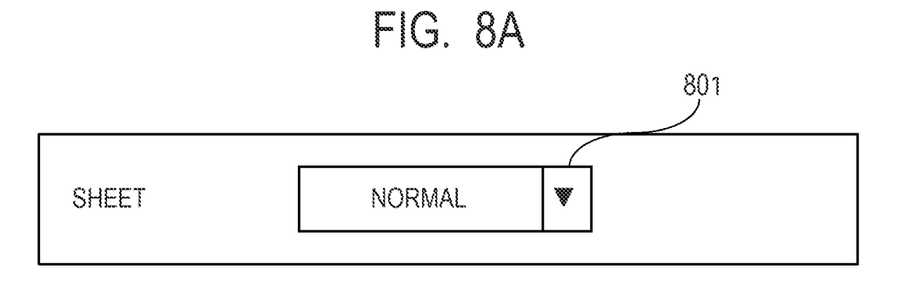
FIG. 8A illustrates a setting screen of an operation unit for setting a sheet type of the image forming apparatus of the present embodiment.

Here, the setting screen of the operation unit 211 that sets the sheet type is described. FIG. 8A illustrates an example showing the setting screen of the operation unit 211 for setting the sheet type. In this example, "plain sheet" is displayed and selected, but the user can select other sheet types (for example, thin sheet, thick sheet, and the like) via a pull-down list 801. By such operation, the default setting of the sheet type can be made for the image forming apparatus 200.

In step S304, the job analysis unit 202 analyzes the received job and determines whether the printing resolution (630b) is set for the job. If the printing resolution is set for the job (Yes in step S304), the process proceeds to step S306.

On the other hand, if the printing resolution is not set in the job (No in step S304), the process proceeds to step S305. In step S305, the print setting unit 204 notifies the job control unit 201 of the printing resolution set by the user via the operation unit 211. The job control unit 201 sets the notified printing resolution as the printing resolution for printing the job, and the process proceeds to step S306.

Figure 8B:
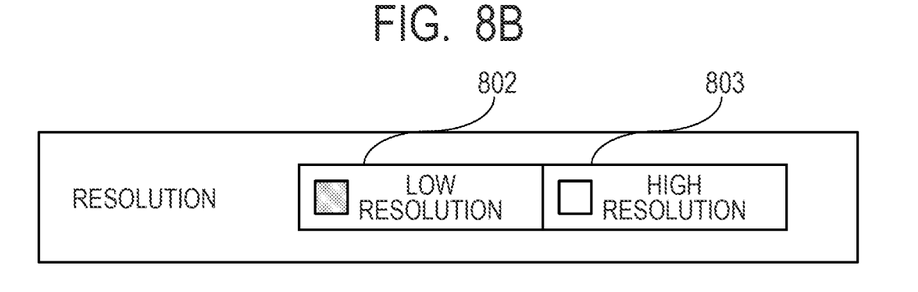
FIG. 8B illustrates a setting screen of the operation unit that can set the resolution of the image forming apparatus of the present embodiment.

Here, the setting screen of the operation unit 211 for setting the resolution is described. FIG. 8B illustrates an example showing the setting screen of the operation unit 211 for setting the printing resolution. In this example, a low printing resolution 802 is selected. The user can select either a low printing resolution 802 or a high printing resolution 803. By such operation, the default setting of the printing resolution can be made for the image forming apparatus 200.

Figure 7A:
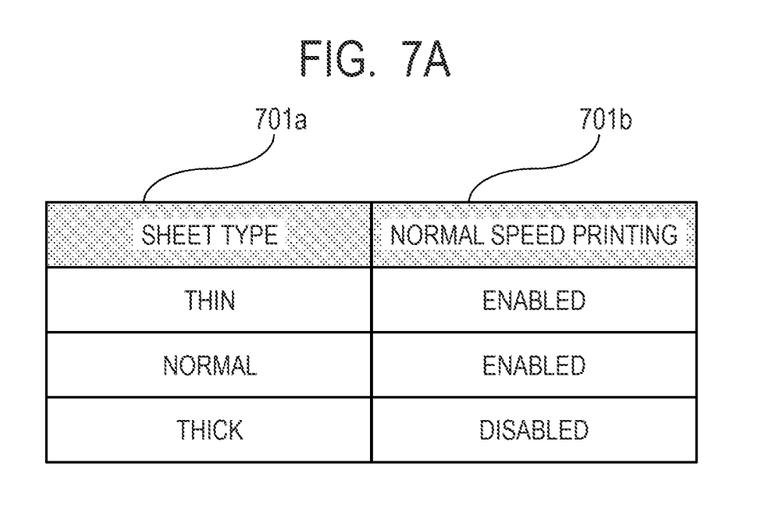
FIG. 7A illustrates a predetermined table stored in the image forming apparatus of the present embodiment.

In step S306, the job control unit 201 confirms the sheet type set for printing the job and determines whether or not normal speed printing is possible on the sheet type set for printing the job. In the present embodiment, the job control unit 201 holds a table shown in FIG. 7A in advance defining whether each sheet type (701a) is capable of normal speed printing (701b). In this example, "thin sheet" and "plain sheet" can be used for printing at normal printing speed, but "thick sheet" can not be used for printing at normal printing speed and must be printed at a lower printing speed. The thick sheet makes it difficult for print toner to fix compared to a thin or plain sheet, so it is necessary to apply more heat to fix print toner. If the thick sheet is printed at the normal printing speed, sufficient heat may not be applied to the sheet during transporting the sheet, the printing toner may not adhere firmly to the sheet, and the printing toner may peel off from the sheet after printing. The thick sheet, therefore, needs to be used for printing at a low printing speed and heated sufficiently during transporting the sheet. The sheet that is impossible to use for printing at the normal printing speed is not limited to the thick sheet and may include other sheets such as sheets with surface treatment.

Figure 7B:
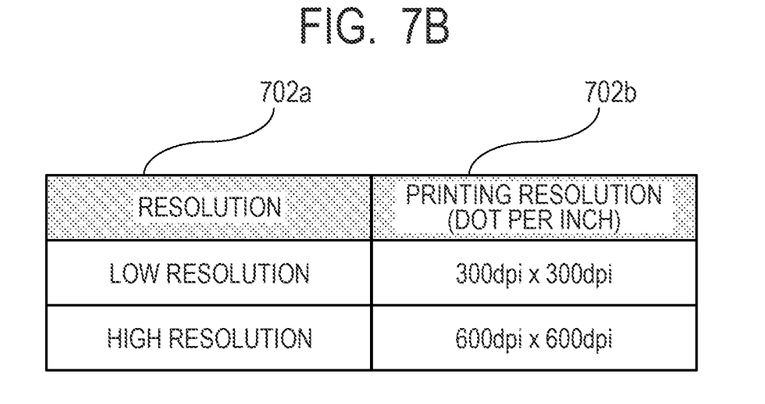
FIG. 7B illustrates a predetermined table stored in the image forming apparatus of the present embodiment.

If printing at the normal printing speed is not possible with the sheet type set for printing the job (No in step S306), the process proceeds to step S309. In step S309, the job control unit 201 determines that the printing resolution in the actual printing process is "high printing resolution" and the printing speed is "low printing speed". In the present embodiment, the job control unit 201 holds a table shown in FIG. 7B in advance defining the resolution set for the job and the actual printing resolution corresponding to the resolution (main scanning resolution dpi×sub-scanning resolution dpi). In this example, since the job control unit 201 determines the printing resolution as "high printing resolution", the printing process is performed at 600 dpi×600 dpi. After step S309, the process proceeds to step S311.

On the other hand, if printing at the normal printing speed is possible with the sheet type set for printing the job (Yes in step S306), the process proceeds to step S307. In step S307, the job control unit 201 determines the printing resolution set for printing the job. If the printing resolution set for printing the job is the high printing resolution ("high resolution" in step S307), the process proceeds to step S309.

On the other hand, if the printing resolution set for printing the job is the low printing resolution ("low resolution" in step S307), the process proceeds to step S308. In step S308, the job control unit 201 determines whether or not the print settings requiring high image quality other than the printing resolution set for printing the job are enabled. The print settings that require high image quality include, for example, print settings that assume a printing resolution of 600 dpi×600 dpi or higher and use processing to make thin lines uniform in thickness.

If the print settings requiring high image quality other than printing resolution are enabled (Yes in step S308), the process proceeds to step S309. On the other hand, if the print settings requiring high image quality other than printing resolution is not enabled (No in step S308), the process proceeds to step S310. In step S310, the job control unit 201 determines the printing resolution in the actual printing process to be "low resolution" and the printing speed to be "normal speed". After step S310, the process proceeds to step S311.

In step S311, the job control unit 201 prints the job at the printing resolution and printing speed determined in step S309 or S310.

As described above, according to the first embodiment, if a sheet type that can not be printed at the normal speed is used, the printing process is automatically switched to the high resolution printing process in accordance with the low speed printing process. The print settings also automatically switch to printing at high printing resolution if print settings that require higher image quality are enabled. According to the job thus received, the printing process can be executed by appropriately switching the printing resolution and printing speed.

Second Embodiment

In the first embodiment, if a sheet type that cannot be used for printing at the normal speed is used, the printing process is automatically switched to printing at the high resolution in accordance with the printing process at the low speed. In addition, it is also described that the printing process is automatically switched to printing at high printing resolution if high printing resolution is specified or if print settings requiring high image quality other than resolution are enabled. In the second embodiment, a configuration that automatically switches the printing process to the printing at high resolution according to drawing commands included in the job will be described.

Figure 4:
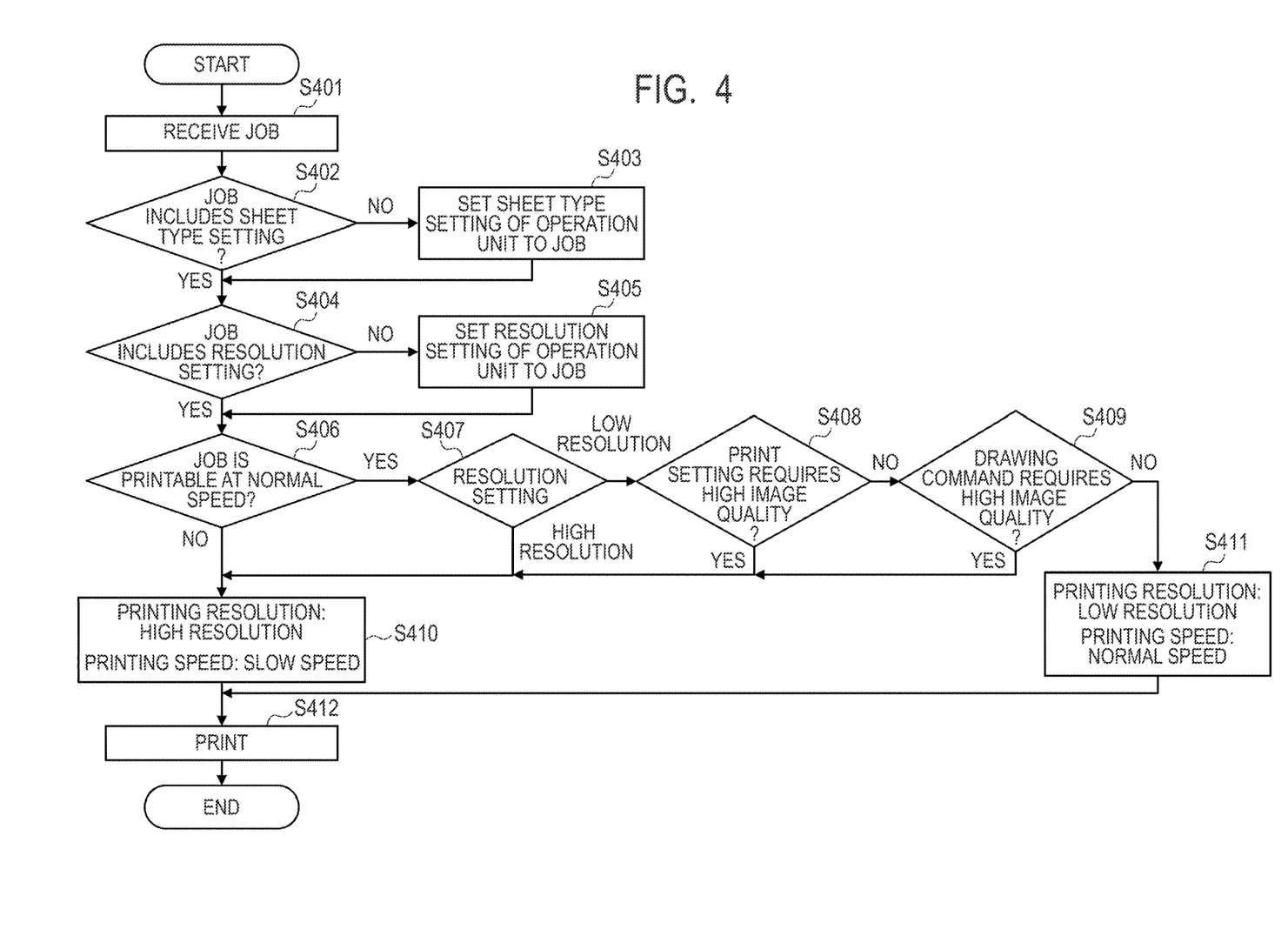
FIG. 4 illustrates a flowchart showing a processing of a control unit of the image forming apparatus of the second embodiment.

FIG. 4 illustrates a flowchart showing an example of processing until the control unit 210 of the image forming apparatus 200 of the second embodiment prints the received job. That is, the processing shown in this flowchart is realized by the CPU 220 reading a program stored in the ROM 221 or the storage apparatus 223 into the RAM 222 and executing the program as needed.

Since steps S401 to S408 are the same processing as steps S301 to S308 in the first embodiment, the explanation is omitted here. In step S409, the job analysis unit 202 of the control unit 210 determines whether the received job includes a drawing command for characters or graphics that requires high image quality. For example, the control unit 210 regards that the received job includes the drawing command requiring high image quality if the job includes a predetermined number of commands for drawing a character size equal to or less than a predetermined size or a line width equal to or less than a predetermined width. More specifically, for example, if there are more drawing commands indicating characters of 6 points or less or lines of 1 pixel or less in width than the number preset by the job analysis unit 202, the control unit 210 determines that the drawing command requiring high image quality is included in the job.

If the drawing command requiring high image quality is included in the job (Yes in step S409), the process proceeds to step S410. Since the processing in steps S410 and S412 is same as that in steps S309 and S311, the description for these steps is omitted here.

On the other hand, if no drawing command requiring high image quality is included in the job (No in step S409), the process proceeds to step S411. Since the processing in steps S411 and S412 is same as that in steps S310 and S311, the description for these steps is omitted here.

As described above, according to the second embodiment, by automatically switching the printing process to the printing at a high resolution according to the drawing command included in the job, an image forming apparatus can switch printing resolution and printing speed more appropriately when printing a document.

Third Embodiment

Figure 5:
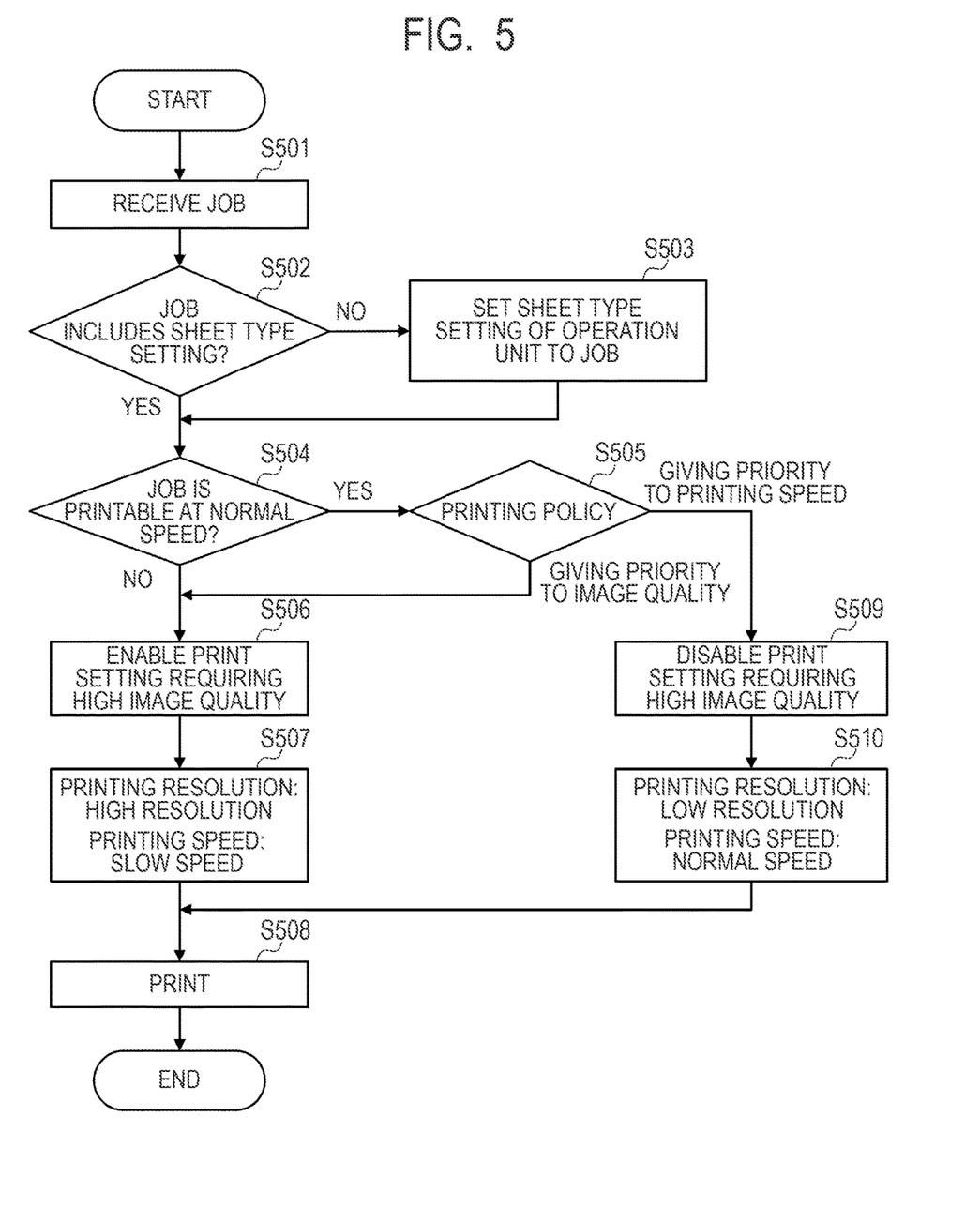
FIG. 5 illustrates a flowchart showing a processing of a control unit of the image forming apparatus of the third embodiment.

In the third embodiment, it is described that the printing resolution and the printing speed are switched according to the setting of printing speed priority/image quality priority. FIG. 5 illustrates a flowchart showing an example of processing until the control unit 210 of the image forming apparatus 200 of the third embodiment prints the received job. That is, the processing shown in this flowchart is realized by the CPU 220 reading a program stored in the ROM 221 or the storage apparatus 223 into the RAM 222 and executing the program as needed.

In step S501, if the job reception unit 205 of the control unit 210 receives a job to perform print processing, the process proceeds to step S502. In step S502, the job analysis unit 202 analyzes the received job and the job control unit 201 determines whether the sheet type (630a) for printing is set in the job. If the sheet type for printing is set in the job (Yes in step S502), the process proceeds to step S504.

On the other hand, if the sheet type for printing is not set in the job (No in step S502), the process proceeds to step S503. In step S503, the print setting unit 204 notifies the job control unit 201 of the sheet type set by the user via the operation unit 211. The job control unit 201 sets the sheet type notified from the print setting unit 204 as the sheet type for printing the job, and the process proceeds to step S504.

In step S504, the job control unit 201 confirms the sheet type set for printing the job and determines whether normal speed printing can be applied to the sheet. If printing at the normal speed cannot be applied to the sheet type set for printing the job (No in step S504), the process proceeds to step S506.

In step S506, the job control unit 201 enables print settings that require high image quality other than the printing resolution. As described in the first embodiment, print settings that require high image quality include, for example, print settings that assume a printing resolution of 600 dpi×600 dpi or higher and use processing to make thin lines uniform in thickness. Then, in step S507, the job control unit 201 determines that the printing resolution in the actual printing process is "high resolution" and the printing speed is "low speed," and the process proceeds to step S508.

On the other hand, in step S504, if printing at the standard speed is possible with the sheet type set for printing the job (Yes in step S504), the process proceeds to step S505. In step S505, the print setting unit 204 notifies the job control unit 201 of the printing policy set for printing by the user via the operation unit 211. The job control unit 201 performs printing processing according to the printing policy notified from the print setting unit 204.

Figure 8C:
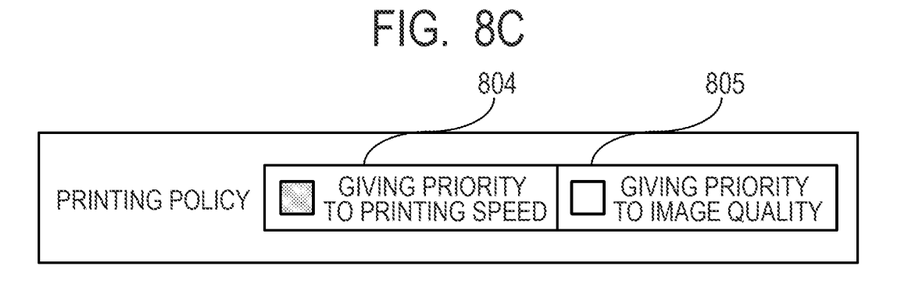
FIG. 8C illustrates a setting screen of the operation unit for setting the printing policy of the image forming apparatus of the present embodiment.

Here, the setting screen of the operation unit 211 for setting the printing policy is described. FIG. 8C illustrates an example showing the setting screen of the operation unit 211 for setting the printing policy. In this example, speed priority 804 is selected, but it is assumed that either the speed priority 804 or image quality priority 805 can be selected by the user's operation. In the present embodiment, "giving priority to printing speed" means that printing speed is given priority over the quality of the print result, and print processing is always performed at normal speed. On the other hand, "giving priority to image quality" means that the quality of the printed result is given priority over the printing speed, and high-quality printing is always performed. By such an operation, the printing policy can be set in the image forming apparatus 200.

If giving priority to image quality is notified ("giving priority to image quality" in step S505), the process proceeds to step S506. On the other hand, if giving priority to printing speed is notified ("giving priority to printing speed" in step S505), the process proceeds to step S509. In step S509, the job control unit 201 invalidates the print settings that require high image quality other than printing resolution. Then, in step S510, the job control unit 201 determines that the printing resolution in the actual printing process is "low resolution" and the printing speed is "normal", and the process proceeds to step S508.

In step S508, the job control unit 201 prints the job at the printing resolution and printing speed determined in step S507 or S510.

As described above, according to the third embodiment, by automatically switching the other print settings according to the setting of "giving priority to printing speed"/"giving priority to image quality", the printing resolution and the printing speed are appropriately switched and the printing process can be performed more easily and comprehensibly.

According to the above examples, the printing process can be executed by appropriately switching the printing resolution and printing speed. As a result, it is possible to obtain the output result of the image quality expected by the user by utilizing the inherent performance of the device, and waste such as reprinting can be suppressed. For example, in case of using a low-cost printer, print processing can be executed by appropriately switching the printing resolution and printing speed according to the received job. There are printer engines for low-cost printers that support two types of printing speeds if printing: normal speed and slower than normal speed. Since the controller that controls the engine for the low-cost printer has little memory available, the controller performs printing at a low resolution so that using even a small amount of memory allows to perform printing at the normal speed provided by the engine. In some cases, such conventional low-cost printers do not produce the expected image quality. For example, if some types of sheets, such as thick sheet, are used, printing is performed by reducing the printing speed to a low speed in order to prevent poor fixing of toner, but printing is performed at a low resolution. However, by applying the configuration of each of the above examples, it becomes possible to perform print processing by appropriately switching the printing resolution and printing speed in case of printers of a low-price range as described above, and to obtain an output result of expected image quality.

The structure and contents of the various data described above are not limited to these examples, and the data may consist of various structures and contents according to the use and purpose.

Although one embodiment has been described above, the present invention can be implemented, for example, as a system, device, method, program or storage medium. Specifically, it may be applied to a system consisting of multiple devices, or it may be applied to a device consisting of a single device. In addition, all of the configurations in which the above examples are combined are also included in the present invention.

According to the present invention, the printing process can be executed by appropriately switching the printing resolution and printing speed. As a result, it is possible to obtain the output result of the image quality expected by the user by utilizing the inherent performance of the device, and waste such as reprinting can be suppressed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-175846, filed Oct. 27, 2021, which is hereby incorporated by reference herein in its entirety.

What is claimed is:

1. An image forming apparatus that is capable of printing an image based on a print job at sheet conveyance speeds of a first conveyance speed and a second conveyance speed, and is capable of printing at a print resolution of a first resolution and at a print resolution of a second resolution higher than the first resolution, the image forming apparatus comprising:
a controller configured to:
receive the print job;
store a setting set by a user, wherein the setting is corresponding to the print resolution that is one of the plurality of print resolutions including the first resolution and the second resolution;
set the second conveyance speed, in a case where a sheet type of a sheet used for printing the received print job is a predetermined sheet type that cannot be conveyed for printing at the first conveyance speed faster than the second conveyance speed;
set the second resolution even though the print resolution specified based on the stored setting set by the user is the first resolution lower than the second resolution, in the case where the sheet type of the sheet used for printing the received print job is the predetermined sheet type;
set a print setting that prioritizes image quality; and
store user's selection of whether to prioritize the image quality or the sheet conveyance speed,
wherein the print resolution and the sheet type are selected by the user, and the sheet conveyance speed is determined based on the sheet type,
wherein in a case where the determined sheet conveyance speed is the second conveyance speed, the controller changes the print resolution to a higher resolution irrespective of the print resolution selected by the user, and
wherein, even though the determined sheet conveyance speed is first conveyance speed, the controller sets the sheet conveyance speed to the second conveyance speed and the print resolution to the second resolution to print the print job in a case where the print setting is set to give priority to the image quality.

2. The image forming apparatus according to claim 1, wherein the predetermined sheet type includes a thick sheet.

3. The image forming apparatus according to claim 1, wherein the controller determines the sheet type of the sheet used for printing the received print job based on a sheet type included in a print setting for the received print job in a case where the print setting for the print job includes a setting for the sheet type, and
wherein the controller determines the sheet type of the sheet used for printing the received print job based on a sheet type set in the image forming apparatus in a case where the print setting for the received print job does not include the setting for the sheet type.

4. The image forming apparatus according to claim 1, wherein the controller sets the conveyance speed to the second conveyance speed and the printing resolution to the second resolution to print the print job in a case where the print setting for the received print job includes a predetermined setting requiring high image quality.

5. The image forming apparatus according to claim 4, wherein the predetermined setting includes a setting that uses a process to make a thickness of a fine line uniform.

6. The image forming apparatus according to claim 1, wherein the controller sets the conveyance speed to the second conveyance speed and the printing resolution to the second resolution to print the print job in a case where the received print job includes a predetermined drawing command requiring high image quality.

7. The image forming apparatus according to claim 6, wherein the received print job includes more than a predetermined number of drawing commands to draw characters of less than a predetermined size or lines of less than a predetermined width in the case where the received print job includes the predetermined drawing command.

8. The image forming apparatus according to claim 1, wherein a predetermined setting requiring the printing resolution to be high image quality is enabled in the case where the print setting is set to give priority to the image quality.

9. The image forming apparatus according to claim 1,
wherein the controller displays a setting screen that displays user selectable options,
wherein the options include giving priority to printing speed or giving priority to image quality, and
wherein the options of giving priority to printing speed or giving priority to image quality are mutually exclusive.

10. The image forming apparatus according to claim 9,
wherein the controller receives a selection from a user via the setting screen.

11. The image forming apparatus according to claim 1,
wherein the image forming apparatus stores a table including plurality of different sheet types, and, for each respective sheet type of the plurality of sheet types, a setting regarding whether normal speed printing is enabled.

12. A method for controlling an image forming apparatus that is capable of printing an image based on a print job at sheet conveyance speeds of a first conveyance speed and a second conveyance speed, and is capable of printing at a print resolution of a first resolution and at a print resolution of a second resolution higher than the first resolution, the method comprising:
receiving the print job;
storing a setting set by a user, wherein the setting is corresponding to the print resolution that is one of the plurality of print resolutions including the first resolution and the second resolution;
setting the second conveyance speed, in a case where a sheet type of a sheet used for printing the received print job is a predetermined sheet type that cannot be conveyed for printing at the first conveyance speed faster than the second conveyance speed;
setting the second resolution even though the print resolution specified based on the stored setting set by the user is the first resolution lower than the second resolution, in the case where the sheet type of the sheet used for printing the received print job is the predetermined sheet type;
setting a print setting that prioritizes image quality; and
store user's selection of whether to prioritize the image quality or the sheet conveyance speed,
wherein the print resolution and the sheet type are selected by the user, and the sheet conveyance speed is determined based on the sheet type,
wherein in a case where the determined sheet conveyance speed is the second conveyance speed, the controller changes the print resolution to a higher resolution irrespective of the print resolution selected by the user, and
wherein, even though the determined sheet conveyance speed is the first conveyance speed, the sheet conveyance speed is set to the second conveyance speed and the print resolution to the second resolution to print the print job in a case where the print setting is set to give priority to the image quality.

13. A non-transitory computer-readable storage medium storing a program that causes a computer to perform a method for controlling an image forming apparatus that is capable of printing an image based on a print job at sheet conveyance speeds of a first conveyance speed and a second conveyance speed, and is capable of printing at a print resolution of a first resolution and at a print resolution of a second resolution higher than the first resolution, the method comprising:

receiving the print job;

storing a setting set by a user, wherein the setting is corresponding to the print resolution that is one of the plurality of print resolutions including the first resolution and the second resolution;

setting the second conveyance speed, in a case where a sheet type of a sheet used for printing the received print job is a predetermined sheet type that cannot be conveyed for printing at the first conveyance speed faster than the second conveyance speed;

setting the second resolution even though the print resolution specified based on the stored setting set by the user is the first resolution lower than the second resolution, in the case where the sheet type of the sheet used for printing the received print job is the predetermined sheet type;

setting a print setting that prioritizes image quality; and store user's selection of whether to prioritize the image quality or the sheet conveyance speed, wherein the print resolution and the sheet type are selected by the user, and the sheet conveyance speed is determined based on the sheet type, wherein in a case where the determined sheet conveyance speed is the second conveyance speed, the controller changes the print resolution to a higher resolution irrespective of the print resolution selected by the user, and wherein, even though the determined sheet conveyance speed is the first conveyance speed, the sheet conveyance speed is set to the second conveyance speed and the print resolution to the second resolution to print the print job in a case where the print setting is set to give priority to the image quality.

* * * * *